United States Patent [11] 3,593,794

[72] Inventors Paul W. Fischer
 Whittier;
 John W. Scheffel, Fullerton, both of, Calif.
[21] Appl. No. 13,864
[22] Filed Feb. 24, 1970
[45] Patented July 20, 1971
[73] Assignee Union Oil Co.
 Los Angles, Calif.

[54] METHOD AND COMPOSITION FOR TREATING LOW-TEMPERATURE SUBTERRANEAN FORMATIONS
19 Claims, No Drawings
[52] U.S. Cl. .................................................. 166/283,
 166/295, 175/72, 252/8.5, 252/8.55
[51] Int. Cl. ...................................................... E21b 33/138,
 E21b 43/26
[50] Field of Search.......................................... 166/281-
 −283, 295, 308; 175/72; 252/8.5 LC, 8.55

[56] References Cited
UNITED STATES PATENTS
3,316,965  5/1967  Watanabe ..................... 175/72 X
3,370,650  2/1968  Watanabe ..................... 166/283 X
3,455,390  7/1969  Gallus ........................... 166/295

Primary Examiner—Ian A. Calvert
Attorneys—Milton W. Lee, Richard C. Hartman, Lannas S. Henderson, Dean Sandford and Robert E. Strauss ABSTRACT: A water-insoluble particulate composition having controlled oil solubility is disclosed. This composition is comprised of solid particles of a homogenous mixture of (1) about 10 to 13 weight percent of an ethylene-vinyl acetate copolymer that contains about 23 to 30 weight percent vinyl acetate and exhibits a melt index of about 300 to 500 grams per 10 minutes and (2) a paraffin wax that contains at least 70 weight percent hydrocarbons having 25 to 32 carbon atoms per molecule. Also, a process employing this particulate composition in drilling wells into low-temperature subterranean formations, and in fracturing and treating such formations, is disclosed.

METHOD AND COMPOSITION FOR TREATING LOW-TEMPERATURE SUBTERRANEAN FORMATIONS

This invention relates to well drilling and treating, and more particularly to a composition and method for temporarily reducing the permeability of low-temperature, permeable oil-bearing formations. The method and compositions of this invention have particular application in hydraulic fracturing, in well treating and in completing oil and gas wells that penetrate low-temperature formations.

Although high fluid permeability is a desirable characteristic of hydrocarbon producing formation, many drilling, fracturing and well-treating operations are adversely affected when a well penetrates such highly permeable formations. The effectiveness and efficiency of these processes are substantially improved by plugging the more permeable strata to reduce the loss of drilling, fracturing, and well-treating fluids thereto. Accordingly, low fluid loss agents have been developed for use in these applications. Also, particulate plugging agents are used as diverting agents in multiple fracturing operations, and to plug selected strata to obtain fluid shutoff.

In the aforesaid applications, it is essential that the temporary fluid loss control or plugging agent be readily removed from the hydrocarbon producing zones to prevent permanent loss of permeability and an attendant reduction in oil production rate. Removal may be effectively accomplished by utilizing an agent that is soluble in the formation hydrocarbons. However, many of the prior art materials are either insoluble under bottom hole conditions, or are so highly soluble that they are difficult to place in the formation and fail to maintain the required plug during the treating operation. It is therefore essential that the fluid loss or plugging agent possess the property of controlled solubility, wherein a satisfactory solid plug will be formed for a period of time, and whereupon the plug will be removed by being slowly dissolved by the formation hydrocarbons.

It is also advantageous to utilize a material that is insoluble in water, thereby leaving any water producing strata permanently sealed. Thus, a selective plugging is effected, the hydrocarbon producing strata being temporarily plugged and the water producing strata remaining permanently plugged. On removal of the temporary plugging agent from the hydrocarbon-producing strata, oil and gas production capability is fully restored, while water production is permanently eliminated or substantially decreased.

Each of the aforesaid well treating processes commonly require a temporary plugging material capable of being formed into small solid particles of controlled size, preferably by an inexpensive technique. The material should be slowly soluble in the formation hydrocarbons and insoluble in water at formation conditions to accomplish the desired selective plugging and complete restoration of hydrocarbon permeability. Particle size is important in controlling the distance that the plugging agent penetrates into the formation and the degree of fluid shutoff obtained. Therefore, it is essential that the particles do not agglomerate or stick together in the treating fluid during the treating operation. While other properties of the particulate agent may influence particle agglomeration, agglomeration is largely controlled by the tackiness of the particle surface. Hence, it is necessary that the plugging particles or agents exhibit a low degree of tackiness on exposure to air at ambient temperatures and also remain nontacky or nonsticky upon exposure to formation hydrocarbons and to the treating fluids. In addition, particles which are somewhat resilient possess superior plugging properties, since they deform to effectively fill flow passages. Also, high mechanical and impact strength is desirable to avoid size reduction of individual particles by attrition.

Various slowly oil-soluble, water-insoluble particulate agents useful in well drilling and treating operations have been developed. In particular, U.S. Pat. No. 3,316,965 discloses the use of homogeneous solid particles of nongaseous hydrocarbon and polymer; U.S. Pat. No. 3,342,263 discloses the use of discrete solid particles of a homogeneous solid mixture of a polymer and a halogenated aromatic hydrocarbon melting above about 120° F., U.S. Pat. No. 3,363,690 discloses solid particles comprised of a homogeneous mixture of polymer, wax, and resin. While these compositions are satisfactory in many well drilling and treating applications, and their use has contributed greatly to increased oil recovery, they have not been completely successful in the treatment of relatively low-temperature subterranean formations.

The bottom-hole temperature of a well varies with the geographical location of the well and with its depth. Many producing wells, particularly in the United States and Canada have bottom-hole temperatures under 125° F., and often as low as 90° F. and below. In order that the treated wells can be returned to full production, the injected temporary plugging or diverting agents must be soluble in the reservoir oil at the reservoir temperature to the extent that substantially all of the plugging agent is removed within a reasonably short time, such as between about 1 and 6 days after returning the well to production. The solid compositions that are completely solubilized by the reservoir oil in less than 12 hours or greater than 6 days have been found to be undesirable for many of the well-treating processes. Many of the compositions disclosed in the foregoing patents, while quite satisfactory for the treatment of formations having temperatures above about 125° F., are not sufficiently soluble at lower temperatures to provide optimum treatment of the lower temperature formations, and particularly those formations having temperatures of 90° F. and below, or do not possess the requisite properties of strength and nontackiness. Thus, there exists a need for a particulate solid composition that is slowly soluble in oil at low formation temperatures, that is insoluble in water, and that exhibits other requisite properties of hardness, strength and nontackiness.

Accordingly, it is an object of this invention to provide an improved well-treating process for temporarily plugging low-temperature subterranean formations. Another object of the invention is to provide an improved well-treating process for plugging or retarding fluid flow through low-temperature earth formations that does not permanently reduce the permeability of the formation to hydrocarbon fluids. Another object of the invention is to provide a process for fracturing low-temperature subterranean formations wherein a diverting agent is deposited in the fracture to retard the flow of fracturing fluid therein and to effect multiple fractures in the formation. Another object of the invention is to provide an effective low fluid loss additive for addition to a fracturing fluid. A still further object is to provide a low fluid loss additive to be added to a fluid placed in a well bore penetrating a low-temperature formation which will act to temporarily reduce the formation permeability without effecting a permanent reduction of the hydrocarbon permeability of the formation. A still further object is to provide a fluid loss additive which is soluble upon prolonged contact with low-temperature reservoir hydrocarbons and that remains nontacky when incorporated into a treating fluid. Other objects and advantages of the invention will be apparent to those skilled in the art from the description thereof which follows.

The foregoing objects and their attendant advantages can be attained by treating the subterranean formation with a particulate material comprising solid particles of a homogeneous mixture of (1) about 10 to 13 weight percent of an ethylene-vinyl acetate copolymer that contains about 23 to 30 weight percent vinyl acetate and exhibits a melt index of about 300 to 500 grams per 10 minutes and (2) paraffin wax that contains at least 70 weight percent hydrocarbons having 25 to 32 carbon atoms per molecule. The particulate composition is insoluble in water and slowly soluble in oil, and is particularly useful as a fluid loss control agent and as a diverting or plugging agent in treating and hydraulically fracturing a low-temperature subterranean earth formation penetrated by a well, and in drilling a well into such formations.

The oil solubility of the particulate composition is determined by intimately contacting the particles with liquid hydrocarbon, such as crude petroleum recovered from a low-temperature formation to be treated, maintained at the temperature of the formation. The particulate compositions of this invention are slowly soluble in oil at a temperature of 125° F., yet are completely soluble on prolonged contact with the oil at a temperature of 90° F. Preferably, the particulate composition is relatively insoluble on contact with oil for a period sufficient to complete the particular treating operation, and completely dissolved or dispersed in the oil at the termination of the treatment. Thus, a particulate composition useful in treating a wide range of low-temperature formations is substantially insoluble on contact with oil at a temperature of 125° F. for a short period of time, and is completely dissolved or dispersed in the oil so that no solid residue remains to plug the oil-bearing strata of the formation after contacting the formation for a prolonged period.

The particulate compositions of this invention exhibit a low degree of tackiness on exposure to air at ambient temperatures and also remain relatively nontacky upon exposure to formation hydrocarbons and to the treating fluids with which they are contacted. Hence, the particles tend to remain as discrete solid particles and do not agglomerate either during storage or during use in a treating operation.

Tackiness value is a relative indication of the tackiness of a particulate composition, and can be determined by a standardized bead adhesion test. In this test, the molten composition to be tested is cooled to 200° F. and dropped onto a horizontal stainless steel plate at ambient temperature using a standard medicine dropper having a 1/16-inch orifice held 1 inch above the plate. After standing for 5 minutes at room temperature, the solidified beads are removed from the plate. The tackiness value is determined by the tenacity with which the beads adhere to the plate, and is rated as follows:

| Tackiness Value | Degree of Adhesion |
| --- | --- |
| 0 | All beads removed from the plate by tipping the plate to an angle of 90°. |
| 0.5 | All beads removed from the plate by mildly scraping the plate with the hand. |
| 1.0 | All beads removed from the plate by scraping with a spatula with no bead residue remaining on the plate. |
| 2.0 | All beads removed from the plate by scraping with a spatula but a residue remains on the plate. |

Intermediate tackiness values are estimated based on the proportion of beads falling into two or more of these categories.

The particulate compositions of this invention exhibit tackiness values determined in accordance with the above techniques of 1.0 or less, and preferably exhibit tackiness values of 0.5, or below.

The particulate compositions which exhibit the desired properties of slow oil solubility and low tackiness value are solid particles of a homogeneous mixture comprising (1) about 10 to 13 weight percent of an ethylene-vinyl acetate copolymer having about 23 to 30 weight percent vinyl acetate and exhibiting a melt index of about 300 to 500 grams per 10 minutes, and more preferably about 335 to 465 grams per 10 minutes, and (2) a paraffin wax containing at least 70 weight percent hydrocarbons having 25 to 32 carbon atoms per molecule.

A particularly preferred polymer for use in the composition of this invention is an ethylene-vinyl acetate copolymer that contains about 24 to 26 weight percent vinyl acetate and exhibits a melt index of about 335 to 465 grams per 10 minutes. A commercial ethylene-vinyl acetate copolymer exemplary of this preferred copolymer is marketed by E. I. duPont de Nemours Company under the trademark Elvax 310.

Another preferred polymer is an ethylene-vinyl acetate copolymer that contains about 27 to 29 weight percent vinyl acetate and exhibits a melt index of about 335 to 465 grams per 10 minutes. A commercial ethylene-vinyl acetate copolymer exemplary of this preferred copolymer is marketed by E. I. duPont de Nemours Company under the trademark Elvax 210.

The term "melt index" as employed herein is the flow rate reported as the rate of extrusion in grams per 10 minutes as determined by ASTM test method D1238–65T entitled "Measuring Flow Rates of Thermoplastics by Extrusion Plastometer" and performed under Standard Test Condition E, ASTM Standards, American Society for Testing and Materials, Part 27, June, 1969, pages 455—466, which procedure is herein incorporated by reference.

The wax employed in the particulate composition of this invention is a crystalline paraffin wax that contains at least 70 weight percent hydrocarbons having 25 to 32 carbon atoms per molecule, and more preferably the wax is a fully refined crystalline paraffin wax. The oil solubility of the particulate composition depends in part on the proportion of hydrocarbon molecules of different carbon chain lengths, i.e., the proportion of hydrocarbons having a different number of carbon atoms per molecule, in the wax. We have found that wide-cut waxes containing hydrocarbons of different carbon chain lengths produce a product of lower oil solubility than the more narrow-cut waxes containing hydrocarbons having a more limited number of carbon chain lengths. In particular, the waxes useful in the compositions of this invention contain at least about 70 weight percent hydrocarbons having 25 to 32 carbon atoms per molecule, and more preferably contain at least about 90 weight percent hydrocarbons having 25 to 32 carbon atoms per molecule. These waxes exhibit melting points of about 138° F. to 145° F., and more preferably of about 140° F. to 142° F. However, melting point alone is not indicative of the carbon chain length or the number of carbon atoms per molecule since the melting point of a wide-cut wax fraction containing hydrocarbons of many different chain lengths may be the same as that of a narrow-cut fraction.

The compositions of this invention are readily prepared by melting the individual components and then admixing the molten liquids in the proper proportions. Alternatively, the solid ingredients can be combined in the proper proportion and then melted to obtain a homogeneous liquid mixture. In either case, the proportion of each component is selected to impart the desired properties to the final solidified product. Compositions suitable for treating low-temperature subterranean formations contain between about 10 and 13 weight percent of the aforementioned ethylene-vinyl acetate copolymers, and preferably between about 10 and 12 weight percent copolymer, with the balance of the mixture comprised of the aforesaid wax. Also, the compositions can contain minor proportions of additives, such as oxidation inhibitors, etc.

A particularly preferred particulate composition comprises solid particles of a homogeneous mixture of (1) about 10 to 13 weight percent of an ethylene-vinyl acetate copolymer that contains 24 to 26 weight percent of vinyl acetate and exhibits a melt index of about 335 to 465 grams per 10 minutes and (2) about 87 to 90 weight percent of a fully refined crystalline paraffin wax containing at least about 90 weight percent hydrocarbons having 25 to 32 carbon atoms per molecule.

Another preferred composition comprises solid particles of a homogeneous mixture of (1) about 10 to 13 weight percent of an ethylene-vinyl acetate copolymer that contains 27 to 29 weight percent of vinyl acetate and exhibits a melt index of about 335 to 465 grams per 10 minutes and (2) about 87 to 90 weight percent of a fully refined, crystalline paraffin wax having at least about 90 weight percent hydrocarbons containing 25 to 32 carbon atoms per molecule.

The solid particles used in the practice of this invention vary widely in size and shape. Typically, these particles can be speroids, cubes, granules, buttons, flat discs, or mixtures thereof, having mean diameters in the range of from about one-half inch to about 1 micron and less. More particularly, the particles can be cubes, buttons, or discs having mean diameters from about one-eighth inch to about one-half inch, speroids or granules in the size range of from about 4 to 200 mesh U.S. standard screen, or particles having mean diameters from about 1 to 50 microns.

The composition of this invention is useful in treating low-temperature subterranean formations having temperatures of 125° F. or less, and is especially useful in treating formations having temperatures of 100° F. or less, and in many instances in the treating of formations having temperatures of 90° F. or less. In its broadest application, the process comprises contacting a subterranean formation penetrated by well with a suspension of solid particles of the aforesaid composition in a suitable carrier liquid injected through the well. This treatment can comprise a single temporary and selective plugging step, or it can be an integral part of a comprehensive fracturing, well drilling, acidizing, or solvent treating process. Also, the particulate composition of this invention can be effectively used as a low fluid loss agent in a drilling fluid employed in well drilling and particularly as a low fluid loss agent in completion fluids employed in the drilling of oil and gas wells, and in workover fluids employed in recompleting oil and gas wells. In the drilling and workover applications, the drilling fluid is circulated from the surface to the drilling zone in a low-temperature formation during the drilling operation, and at least a portion of the fluid is returned to the surface. The particulate compositions of this invention can be incorporated in the fracturing fluids employed in hydraulically fracturing an earth formation surrounding a well, and the composition can be employed in chemical treating, acidizing, and other well-treating operations wherein it is desired to control fluid loss to permeable underground structures.

The particulate compositions of this invention can be more readily dispersed into a carrier liquid by the addition of a small amount of a surface-active agent to the carrier liquid. Also, small amounts of a surface-active agent or a mixture of surface-active agents can be added to the dispersion to enhance the plugging properties of the particles. Furthermore, other agents can be incorporated into the suspension of plugging particles, and the use of such agents is included within the scope of this invention.

The invention is further illustrated by the following examples which are illustrative of specific modes of practicing the invention, and are not intended as limiting the scope of the invention as defined by the appended claims.

EXAMPLES 1—19

The criticality of the particular ethylene-vinyl acetate copolymer and paraffin wax employed in preparing the compositions of this invention is illustrated by this series of examples. In each example a particulate diverting agent composition is prepared by admixing 10 weight percent of various molten ethylene-vinyl acetate copolymers marketed by the E. I. duPont de Nemours Company under the trademark Elvax and about 90 weight percent of various paraffin waxes. The tackiness of the various compositions is determined in the manner heretofore described, and the compositions are formed into solid diverting agent particles.

The oil solubilities of solid particles of the various compositions are determined by placing four 3/16-inch diameter particles of each of the various compositions in each of six 6-dram vials. Two of the vials containing each composition are separately filled with a 39.6° API crude oil from the Reagon field, Montana; two of the vials are filled with a 42.9° API crude oil from the Graylin field, Michigan; and two of the vials are filled with a solvent comprised of 70 volume percent kerosene and 30 volume percent 90 neutral oil (a paraffinic lubricating oil having a viscosity of about 90 SUS at 100° F.). One set of three vials containing one vial of each of the solvents is placed in an oven maintained at 95° F. and rotated at approximately 16 r.p.m. for about 6 days, and the other set of three vials is placed in an oven maintained at 90° F. and similarly rotated. At the end of the 6-day period, the vials are removed from the oven and the contents poured over a 100 mesh U.S. standard screen and the screen examined for solid particles. The compositions leaving trace amounts or more of particles on the screen after exposure to any of the three solvents are deemed insoluble, and the compositions leaving no detectable solid residue on the screen are deemed soluble.

The results of these tests are reported in table 2.

TABLE 2.—SOLID WAX/ETHYLENE-VINYL ACETATE COPOLYMER COMPOSITIONS AND THEIR PROPERTIES

| | Copolymer | | | Wax | | | Properties | | |
|---|---|---|---|---|---|---|---|---|---|
| | | VA[2] content wt. percent | Melt index[3] (g./10 min.) | | | 25-32 CN[4] wt. percent | | Solubility[5] | |
| Example | Trademark[1] | | | Supplier | Trademark | | Tackiness | at 95° F. | at 90° F. |
| 1 | Elvax 40 | 39–42 | 45–70 | Union Oil Co. of California | Aristowax 140S | 94 | 1.0 | S | S |
| 2 | Elvax 210 | 27–29 | 335–465 | do | do | 94 | 0.2 | S | S |
| 3 | Elvax 220 | 27–29 | 125–175 | do | do | 94 | 0.2 | I | I |
| 4 | Elvax 310 | 24–26 | 335–465 | do | do | 94 | 0.2 | S | I |
| 5 | Elvax 410 | 17–19 | 430–580 | do | do | 94 | 0.2 | I | I |
| 6 | Elvax 210 | 27–29 | 335–465 | Standard Oil Co. of California | Chevron 140-142 | 91 | 0.5 | S | S |
| 7 | Elvax 220 | 27–29 | 125–175 | do | do | 91 | 0.5 | I | I |
| 8 | Elvax 310 | 24–26 | 335–465 | do | do | 91 | 0.2 | S | I |
| 9 | Elvax 410 | 17–19 | 430–580 | do | do | 91 | 0.2 | I | I |
| 10 | Elvax 210 | 27–29 | 365–465 | Cities Service Co | Cities Service 138 | 82 | 0.5 | S | I |
| 11 | Elvax 220 | 27–29 | 125–175 | do | do | 82 | 0.5 | I | I |
| 12 | Elvax 310 | 24–26 | 335–465 | do | do | 82 | 0.2 | S | I |
| 13 | Elvax 410 | 17–19 | 430–580 | do | do | 82 | 0.2 | I | I |
| 14 | Elvax 210 | 27–29 | 335–465 | Union Oil Co. of California | Pure 140 | 71 | 0.2 | S | I |
| 15 | Elvax 220 | 27–29 | 125–175 | do | do | 71 | 0.5 | I | I |
| 16 | Elvax 310 | 24–26 | 335–465 | do | do | 71 | 0 | S | I |
| 17 | Elvax 410 | 17–19 | 430–580 | do | do | 71 | 0 | I | I |
| 18 | Elvax 210 | 27–29 | 335–465 | do | Aristowax 143-150 | 58 | 0.2 | I | I |
| 19 | Elvax 310 | 24–26 | 335–580 | do | do | 58 | 0.2 | I | I |

[1] Elvax copolymers are marketed by E. I. duPont de Nemours Company.
[2] Vinyl acetate content of the ethylene-vinyl acetate copolymer.
[3] Melt Index as determined by ASTM D-1238-65T.
[4] Content of hydrocarbons in wax having 25 to 32 carbon atms per molecule.
[5] The symbol S means soluble and the symbol I means insoluble.

As shown in table 2, the compositions that are soluble in all three solvents at 95° F. are comprised of mixtures of (1) ethylene-vinyl acetate copolymers that contain 24—29 weight percent vinyl acetate and exhibit a melt index of 335 to 465 grams per 10 minutes and (2) paraffin waxes containing at least 71 weight percent hydrocarbons having 25 to 32 carbon atoms per molecule; and the compositions that are soluble at 90° F. contain paraffin waxes having at least 91 weight percent hydrocarbons having 25 to 32 carbon atoms per molecule. The data reported in table 2 further illustrate the effect of the ethylene-vinyl acetate copolymer composition on the solubility and tackiness of the wax-copolymer product. Example 1, for instance, shows that copolymers having high vinyl acetate contents and low melt indexes render the product too tacky, while examples 5, 9, 13 and 17 illustrate that copolymers with low vinyl acetate contents adversely affect the solubility of the wax-copolymer product.

EXAMPLE 20

A diverting agent composition is prepared by admixing (1) 12 weight percent of a molten ethylene-vinyl acetate copolymer containing about 24 to 26 weight percent vinyl acetate and exhibiting a melt index of about 335 to 465 grams per 10 minutes, (2) about 87.9 weight percent of a molten paraffin wax that has a melting point of about 140° to 142° F. and contains about 94 weight percent hydrocarbons having 25 to 32 carbon atoms per molecule, and (3) 0.1 weight percent of 2,6-ditertiary butyl-para-cresol, an oxidation inhibitor. The ethylene-vinyl acetate copolymer is marketed by the E. I. duPont de Nemours Company under the trademark Elvax 310. The wax is a fully refined, crystalline paraffin wax marketed by the Union Oil Company of California under the trademark Aristowax 140S.

The molten wax-copolymer composition is formed into discrete solid particles of the following size ranges:

1. Flat buttons having a thickness of approximately one-sixteenth inch and a diameter of about one-fourth inch to three-eighths inch;
2. Particles having sizes in the range of about 8 to 100 mesh U.S. standard screen; and
3. Particles having sizes in the range of about 1 micron to 100 mesh U.S. standard screen.

Approximately 50 percent of the particles in the 8 to 100 mesh size range have sizes in the range of 8 to 20 mesh U.S. standard screen and about 50 percent have sizes in the range of 20 to 100 mesh.

EXAMPLE 21

This example illustrates the use of the method and composition of this invention in treating a low-temperature, subterranean, oil-containing reservoir to stimulate the recovery of oil therefrom. The well is completed in a relatively shallow reservoir having a temperature of 90° to 95° F., with a total productive interval of 10 feet perforated with two holes per foot at the depths of 3,066 to 3,072 feet and 3,082 to 3,086 feet.

The stimulation treatment is performed by injecting 3,000 gallons of 15 percent hydrochloric acid into the well, then introducing 12 pounds of particulate diverting agent, and then injecting another 3,000 gallons of acid. The diverting agent comprises flat buttons approximately one-fourth inch to three-eighths inch in diameter of the slowly oil-soluble, water-insoluble homogeneous solid composition described in example 20. The initial slug of acid is injected into the well under vacuum. However, the second slug of acid injected after treatment with the diverting agent particles is injected at a surface pressure of 1,100 p.s.i.g.

Upon completion of the acid injection, the well is flushed with lease crude and then with water, and the well returned to production. The production rate of oil is observed and found to be substantially higher than the rate prior to the stimulation treatment, which indicates that the stimulation treatment is successful and that the diverting agent particles are substantially removed from the oil-producing zones.

EXAMPLE 22

This example illustrates the use of the method and composition of this invention in fracturing a low-temperature, subterranean oil-producing formation. A production well is completed in a relatively shallow reservoir having a temperature of 90° to 95° F., with a total productive interval of 15 feet perforated with two holes per foot at the depths of 2,903 to 2,908 feet and 2,918 to 2,928 feet.

Fracturing is accomplished by injecting 10,000 pounds of 20 to 40 mesh sand in 10,000 gallons gelled brine into the well at a volume flow rate and pressure sufficient to fracture the formation. After approximately one-half of the fracturing fluid is injected, 10 pounds of diverting agent particles are slugged into the well and the fracturing fluid injection continued. The diverting agent comprises flat buttons approximately one-quarter inch to three-eighths inch in diameter of the slowly oil-soluble, water-insoluble homogeneous solid composition described in example 20. The initial portion of the fracturing fluid is injected at a surface pressure of 950 p.s.i.g. However, the injection pressure is increased to 1,500 p.s.i.g. after treatment with the diverting agent.

Upon completion of the fracturing operation, the well is flushed with lease crude and returned to production. The production rate of oil is observed and found to be substantially higher than the rate prior to fracturing, which indicates that the fracturing operation is successful and that the diverting agent particles are substantially removed from the oil-producing zones.

EXAMPLE 23

This example illustrates the use of the method and composition of this invention in drilling a well into a low-temperature formation having a temperature of 90° to 95° F. This well had previously been drilled to a depth of 3,108 feet and then plugged to a depth of 2,924 feet with pea gravel and cement. For a number of years the well was produced from a productive interval from 2,911 to 2,922 feet. However, it is now desired to open lower zones to production.

The plug is drilled out using a 3¾-inch-diameter bit on a conventional tubing string. Brine is used as a drilling fluid, and is circulated from the surface to the drilling zone and returned to the surface. The well is drilled from 2,924 feet to 3,005 feet without incident, but circulation is lost to the formation at 3,005 feet. Approximately 750 pounds of diverting agent particles are added to a gelled brine and the drilling resumed using this material as the drilling fluid. The diverting agent comprises particles of the slowly oil-soluble, water-insoluble homogeneous solid composition described in example 20, the particles having sizes in the range of 8 to 100 mesh U.S. standard screen, with approximately 50 percent of the particles having sizes in the range of 8 to 20 mesh and 50 percent having sizes in the range of 20 to 100 mesh. After addition of the diverting agent, good fluid circulation is observed. Drilling is continued to a depth of 3,108 feet without further difficulty.

The gelled brine is displaced from the well with ungelled brine, and again the formation did not take fluid. Then, 14 barrels of lease crude is placed in the well and allowed to stand overnight. After the oil soak, it is observed that the formation is open and readily capable of taking fluid.

While particular embodiments of the invention have been described, it will be understood, of course, that the invention is not limited thereto since many obvious modifications can be made, and it is intended to include within this invention any such modifications as will fall within the scope of the claims.

The invention having thus been described, we claim:

1. A method of treating low-temperature subterranean formations penetrated by a well bore comprising injecting through said well bore and into contact with said formation a liquid having suspended therein discrete slowly oil-soluble, water-insoluble, solid particles comprised of a homogeneous mixture of (1) about 10 to 13 weight percent of an ethylene-vinyl acetate copolymer that contains about 23 to 30 weight percent vinyl acetate and exhibits a melt index of about 30 to 500 grams per 10 minutes and (2) paraffin wax that contains at least 70 weight percent hydrocarbons having 25 to 32 carbon atoms per molecule.

2. The method defined in claim 1 wherein said ethylene-vinyl acetate copolymer contains about 24 to 26 weight percent vinyl acetate and exhibits a melt index of about 335 to 465 grams per 10 minutes, and wherein said paraffin wax contains at least 90 weight percent hydrocarbons having 25 to 32 carbon atoms per molecule.

3. The method defined in claim 1 wherein said ethylene-vinyl acetate copolymer contains about 27 to 29 weight percent vinyl acetate and exhibits a melt index of about 335 to 465 grams per 10 minutes, and wherein said paraffin wax contains at least 90 weight percent hydrocarbons having 25 to 32 carbon atoms per molecule.

4. The method defined in claim 1 wherein the temperature of said formation is less than about 125° F.

5. The method of completing a well drilled into a permeable, low-temperature, subterranean formation which comprises circulating a completion fluid from the surface to a drilling zone in said formation during the drilling operation and returning to the surface at least a portion of said fluid, said completion fluid comprising a liquid having suspended therein discrete slowly oil-soluble, water-insoluble, solid particles comprised of a homogeneous mixture of (1) about 10 to 13 weight percent of an ethylene-vinyl acetate copolymer that contains about 23 to 30 weight percent vinyl acetate and exhibits a melt index of about 300 to 500 grams per 10 minutes and (2) parafin wax that contains at least 70 weight percent hydrocarbons having 25 to 32 carbon atoms per molecule.

6. The method defined in claim 5 wherein said ethylene-vinyl acetate copolymer contains about 24 to 26 weight percent vinyl acetate and exhibits a melt index of about 335 to 465 grams per 10 minutes, and wherein said paraffin wax contains at least 90 weight percent hydrocarbons having 25 to 32 carbon atoms per molecule.

7. The method defined in claim 5 wherein said ethylene-vinyl acetate copolymer contains between about 27 to 29 weight percent vinyl acetate and exhibits a melt index of about 335 to 465 grams per 10 minutes, and wherein said paraffin wax contains at least 90 percent hydrocarbons having 25 to 32 carbon atoms per molecule.

8. The method defined in claim 5 wherein the temperature of said formation is less than about 125° F.

9. A method of fracturing a permeable, low-temperature subterranean formation penetrated by a well which comprises injecting a fracturing fluid into said well and into contact with said formation at a pressure and volumetric flow rate sufficient to fracture said formation, said fracturing fluid comprising a liquid having suspended therein discrete oil-soluble, water-insoluble, solid particles of a homogeneous mixture of (1) about 10 to 13 weight percent of an ethylene-vinyl acetate copolymer that contains about 23 to 30 weight percent vinyl acetate and that exhibits a melt index of about 300 to 500 grams per 10 minutes and (2) paraffin wax that contains at least 70 weight percent hydrocarbons having 25 to 32 carbon atoms per molecule.

10. The method defined in claim 9 wherein said ethylene-vinyl acetate copolymer contains about 24 to 26 weight percent vinyl acetate and exhibits a melt index of about 335 to 465 grams per 10 minutes, and wherein said paraffin wax contains at least 90 weight percent hydrocarbons having 25 to 32 carbon atoms per molecule.

11. The method defined in claim 9 wherein said ethylene-vinyl acetate copolymer contains about 27 to 29 weight percent vinyl acetate and exhibits a melt index of about 335 to 465 grams per 10 minutes, and wherein said paraffin wax contains at least 90 weight percent hydrocarbons having 25 to 32 carbon atoms per molecule.

12. The method defined in claim 9 wherein the temperature of said formation is less than about 125° F.

13. A well-treating composition comprising discrete solid particles of a homogeneous mixture of (1) about 10 to 13 weight percent of an ethylene-vinyl acetate copolymer that contains about 23 to 30 weight percent vinyl acetate and exhibits a melt index of about 300 to 500 grams per 10 minutes and (2) paraffin wax that contains at least 70 weight percent hydrocarbons having 25 to 32 carbon atoms per molecule.

14. The composition defined in claim 13 wherein said wax contains at least 90 weight percent hydrocarbons having 25 to 32 carbon atoms per molecule.

15. The composition defined in claim 13 wherein said ethylene-vinyl acetate copolymer contains about 24 to 26 weight percent vinyl acetate and exhibits a melt index of about 335 to 465 grams per 10 minutes.

16. The composition defined in claim 13 wherein said ethylene-vinyl acetate copolymer contains about 27 to 29 weight percent vinyl acetate and exhibits a melt index of about 335 to 465 grams per 10 minutes.

17. The composition defined in claim 13 wherein said discrete particles have a mean diameter within the range of about 1 micron to about one-half inch.

18. A well-treating composition comprising discrete solid particles of a homogeneous mixture of (1) about 10 to 13 weight percent of an ethylene-vinyl acetate copolymer that contains about 24 to 26 weight percent vinyl acetate and that exhibits a melt index of about 335 to 465 grams per 10 minutes and (2) a fully refined crystalline paraffin wax that contains at least 90 weight percent hydrocarbons having 25 to 32 carbon atoms per molecule.

19. A well-treating composition comprising discrete solid particles of a homogeneous mixture of (1) about 10 to 13 weight percent of an ethylene-vinyl acetate copolymer that contains about 27 to 29 weight percent vinyl acetate and exhibits a melt index of about 335 to 465 grams per 10 minutes and (2) a fully refined, crystalline paraffin wax that contains at least 90 weight percent hydrocarbons having about 25 to 32 carbon atoms per molecule.

UNITED STATES PATENT OFFICE
CERTIFICATE OF CORRECTION

Patent No. 3,593,794          Dated July 20, 1971

Inventor(s) Paul W. Fischer and John W. Scheffel

It is certified that error appears in the above-identified patent and that said Letters Patent are hereby corrected as shown below:

Claim 1, column 8, line 68 -- 30 -- should be "300".

Signed and sealed this 11th day of January 1972.

(SEAL)
Attest:

EDWARD M. FLETCHER, JR.                ROBERT GOTTSCHALK
Attesting Officer                      Acting Commissioner of Patents